US010798176B2

(12) United States Patent
Sciancalepore et al.

(10) Patent No.: US 10,798,176 B2
(45) Date of Patent: Oct. 6, 2020

(54) JOINT IOT BROKER AND NETWORK SLICE MANAGEMENT COMPONENT

(71) Applicant: NEC Laboratories Europe GmbH, Heidelberg (DE)

(72) Inventors: Vincenzo Sciancalepore, Heidelberg (DE); Flavio Cirillo, Heidelberg (DE); Xavier Costa Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/492,633

(22) PCT Filed: Sep. 18, 2017

(86) PCT No.: PCT/EP2017/073479
§ 371 (c)(1),
(2) Date: Sep. 10, 2019

(87) PCT Pub. No.: WO2018/188767
PCT Pub. Date: Oct. 18, 2018

(65) Prior Publication Data
US 2020/0059521 A1    Feb. 20, 2020

(30) Foreign Application Priority Data
Apr. 13, 2017 (EP) .................................... 17166651

(51) Int. Cl.
*H04L 12/28* (2006.01)
*H04L 29/08* (2006.01)
(Continued)

(52) U.S. Cl.
CPC .............. *H04L 67/12* (2013.01); *H04L 47/70* (2013.01); *H04L 67/10* (2013.01); *H04L 67/34* (2013.01)

(58) Field of Classification Search
CPC .... H04W 72/042; H04W 16/10; H04L 7/088; H04L 47/781; H04L 67/10
(Continued)

(56) References Cited

U.S. PATENT DOCUMENTS

2016/0352645 A1    12/2016  Senarath et al.
2017/0104609 A1*    4/2017  McNamee .......... H04L 12/4641
(Continued)

FOREIGN PATENT DOCUMENTS

WO    WO 2016198104 A1    12/2016

OTHER PUBLICATIONS

Sanchez, et al. "Integration of Utilities Infrastructures in a Future Internet Enabled Smart City Framework", *Sensors 1* (11): 14438-14465 (Jan. 1, 2013). XP055095392.
(Continued)

*Primary Examiner* — John Pezzlo
(74) *Attorney, Agent, or Firm* — Leydig, Voit & Mayer, Ltd.

(57) ABSTRACT

A method for Internet of Things (IoT) traffic management in a communication network supporting a plurality of network slices, in particular a 5$^{th}$ generation wireless communication network, includes dynamically assigning, by a network slice management component, network resources to a number of network slices. One or more of the network slices are dedicated IoT network slices being adapted to enable IoT-related communications between an IoT platform and IoT devices or IoT gateways. The method also includes the network slice management component, interacting with an IoT broker associated with the IoT platform and, based on the interaction, performing actions with respect to an allocation of network resources to the number of network slices and/or triggering actions on the IoT broker with respect to a configuration of IoT data traffic.

13 Claims, 8 Drawing Sheets

(51) Int. Cl.
*H04L 12/911* (2013.01)
*H04J 1/16* (2006.01)

(58) Field of Classification Search
USPC .......................................... 370/252, 329, 386
See application file for complete search history.

(56) References Cited

U.S. PATENT DOCUMENTS

2017/0187819 A1* 6/2017 Aizman .............. H04L 67/2833
2018/0343567 A1* 11/2018 Ashrafi ................... H04L 67/10
2019/0007899 A1* 1/2019 Vrzic .................... H04W 16/10

OTHER PUBLICATIONS

Srdjan, et al. "Designing IoT Architecture(s): A European Perspective", *IEEE World Forum on Internet of Things (WF-IOT)*: 79-84 (Mar. 6, 2014). XP032589848.
Singh, et al. "An SLA-Based Resource Allocation for IoT Applications in Cloud Environments", Cloudification of the Internet of Things (CIOT): 1-6 (Nov. 23, 2016). XP033074775.

* cited by examiner

US 10,798,176 B2

JOINT IOT BROKER AND NETWORK SLICE MANAGEMENT COMPONENT

CROSS REFERENCE TO PRIOR APPLICATIONS

This application is a U.S. National Stage Application under 35 U.S.C. § 371 of International Application No. PCT/EP2017/073479 filed on Sep. 18, 2017, and claims benefit to European Patent Application No. EP 17166651.4 filed on Apr. 13, 2017. The International Application was published in English on Oct. 18, 2018, as WO 2018/188767 A1 under PCT Article 21(2).

FIELD

The present invention relates to a method and a system for IoT traffic management in a communication network supporting a plurality of network slices, in particular a 5$^{th}$ generation wireless communication network.

BACKGROUND

With the continuously increasing number of connected Internet-of-Things (IoT) devices, foreseen as tens of Billion by 2020, as well as even more IoT application scenarios identified, the IoT market has got its momentum in the small and medium-sized enterprises (SMEs) market, whereas playing a key-role for non-Information Technology enterprises (e.g., retail providers, shopping malls, airports, train operators, municipalities), which aim to leverage their own produced data for optimizing industrial processes or for creating new businesses. To this aim, the evolution of new network technologies is enlarging its horizon to account for such a market exhibiting as one of their strengths a bigger flexibility on network definition and network virtualization. A clear example is represented by the novel Network Slicing (NS) concept applying to the 5$^{th}$ generation of mobile networks, namely 5G Networks.

The Next Generation Mobile Network Alliance (NGMN) defines 5G network slice as a driver concept for running multiple logical networks as independent business operations on a common shared physical infrastructure (for reference, see NGMN Alliance, NGMN Network Slicing "Description of Network Slicing Concept" [online], https://www.ngmn.org/uploads/media/160113_Network Slicing_v1_0.pdf). Therefore, each of those network slices represents a virtualized independent end-to-end network allowing infrastructure providers to deploy different architectures in parallel. A network slice is intended as a logical self-contained end-to-end construct provided with customized functions—including those at the user equipment (UE) side—and network function chains for delivering required services to customers.

Interestingly, telecom operators may customize their own networks by opening their infrastructure to novel business players, such as virtual mobile network operators (VMNOs), third-parties as well as Over-The-Top (OTT) applications, as shown in FIG. 1. Such entities behave as tenants of the same infrastructure: This opens new challenges in designing a network resources allocation, e.g., RAN resources, network functions, which must guarantee the resource isolation principle and, at the same time, it improves the multiplexing gain resulting in a more cost-effective allocation for the infrastructure provider. This problem is promptly faced when the network slicing concept is deployed on the network facilities.

While the flexibility introduced with network slicing dynamics fosters a network virtualization evolution, infrastructure providers do not quantify yet the real benefit brought to their current business cases. There is a real need of assessing and brokering the network slicing operations between infrastructure providers and different tenants. Recently, 3GPP has standardized a logically centralized entity, namely capacity broker (several aspects of which are described in WO 2016/198104 A1), that resides inside the infrastructure provider's network in charge of admission control operations. This functional block has been extensively improved (for reference, see FI-WARE NGSI Open RESTful API Specification https://forge.fiware.org/plugins/mediawiki/wiki/fiware/index.php/FI-WARE_NGSI_Open_RESTful_API_Specification) to provide a means for optimally allocating and configuring RAN network slices based on an on-demand network slice request service. Specifically, tenants may easily acquire their own network slice through a given interface by specifying the time duration and the application requirements for such a network slice. In addition, slice maintenance mechanisms are required to continuously satisfy tenants' SLAs while admitting new network slice requests. This may be obtained through monitoring and scaling operations towards the network slice broker.

SUMMARY

In an embodiment, the present invention provides a method for Internet of Things (IoT) traffic management in a communication network supporting a plurality of network slices, in particular a 5th generation wireless communication network. The method includes dynamically assigning, by a network slice management component, network resources to a number of network slices. One or more of the network slices are dedicated IoT network slices being adapted to enable IoT-related communications between an IoT platform and IoT devices or IoT gateways. The method also includes the network slice management component, interacting with an IoT broker associated with the IoT platform and, based on the interaction, performing actions with respect to an allocation of network resources to the number of network slices and/or triggering actions on the IoT broker with respect to a configuration of IoT data traffic.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

Throughout the figures like reference numerals denote like components.

DETAILED DESCRIPTION

Figure 1:
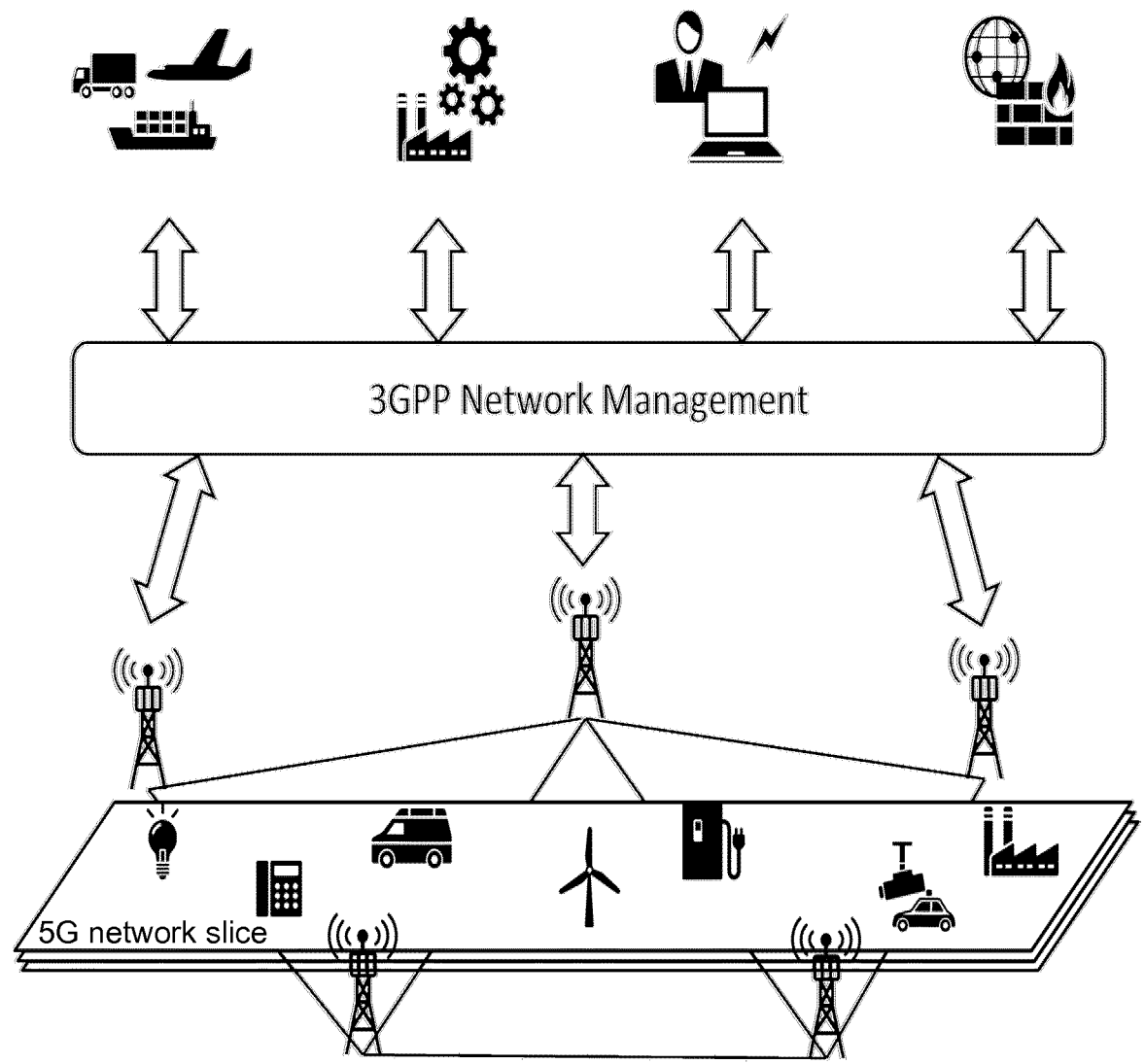
FIG. 1 is a schematic view illustrating several examples of 5G Network Slicing business cases.

Along the direct communication between infrastructure provider and tenant, several challenges can be identified. On the one side, the infrastructure provider applies and defines optimization algorithms for maximizing the allocation of virtual network slices aiming at the maximization of the revenues. On the other side, the tenants (i.e. the network slice customers) aim at minimizing the slice parameters with the dual target of minimizing the costs while keeping affordable the Quality of Service required. This usually results in a sub-optimal slicing configuration and limited and inefficient resource utilization and monetization.

Embodiments of the present invention improve and further develop a method and a system for IoT traffic management in a communication network supporting a plurality of network slices in such a way that the issues described above are overcome or at least partially alleviated. Specifically, in some embodiments the invention targets to solve the provider-customer problem in IoT scenarios for efficiently allocating/maintaining/configuring the 5G network slice for IoT devices, namely IoT network slice, while fulfilling the communication constraints between IoT entities.

In accordance with an embodiment of the invention, the aforementioned improvements are accomplished by a method for IoT traffic management in a communication network supporting a plurality of network slices, in particular a $5^{th}$ generation wireless communication network, the method comprising:

by a network slice management component, dynamically assigning network resources to a number of network slices, wherein one or more of said network slices are dedicated IoT network slices being adapted to enable IoT-related communications between an IoT platform and IoT devices or IoT gateways, by the network slice management component, interacting with an IoT broker associated with the IoT platform and, based on said interaction, performing actions with respect to an allocation of network resources to said number of network slices and/or triggering actions on the IoT broker with respect to a configuration of IoT data traffic.

Furthermore, the above improvements are accomplished in accordance with an embodiment of the invention by a system for IoT traffic management in a communication network supporting a plurality of network slices, in particular a $5^{th}$ generation wireless communication network, the system comprising:

a network slice management component configured to dynamically assign network resources to a number of network slices, wherein one or more of said network slices are dedicated IoT network slices that are adapted to enable IoT-related communications between an IoT platform and IoT devices or IoT gateways, an IoT broker configured to gather IoT data from IoT devices or IoT gateways based on IoT requests from IoT applications, and a bidirectional interface adapted to enable interaction between the network slice management component and the IoT broker, wherein the network slice management component is adapted, based on said interaction, to allocate network resources to said number of network slices and/or to trigger actions on said IoT broker with respect to a configuration of IoT data traffic.

According to embodiments of the invention it has been recognized that the above improvements can be accomplished by enabling interaction between the network slice management component, e.g. 5G network slice Manager, and an IoT broker of the IoT platform such that, based on this interaction, the network slice management component is enabled to perform actions with respect to an allocation of network resources to the network slices and/or to trigger actions on the IoT broker with respect to a configuration of IoT data traffic. The interaction is performed via a bidirectional direct interface between the 5G Network slice manager and the IoT Broker. Effectively, the present invention provides a system comprising a network slicing manager and an IoT Broker that engage a negotiation to efficiently allocate and manage cellular resources while, at the same time, guaranteeing the IoT communication SLAs. Consequently, the present invention provides a technological solution for optimizing the IoT traffic of many IoT domains within a 5G Network Slicing concept. In particular, according to an aspect, the invention provides the means for IoT Broker and 5G Network Slice management to communicate and efficiently orchestrate IoT traffic and/or network slicing operations.

According to an embodiment, the present invention provides a detailed message flow between the IoT broker and the 5G network management responsible for properly configuring network slices to (i) limit (e.g., by changing granularity of requested information) the IoT message load when 5G network congestions occur, (ii) rescheduling IoT messages for underloaded periods of time, and/or (iii) prepare 5G network facilities (e.g., by rescaling other network slices, offloading, denying) when mission-critical messages must be exchanged between IoT entities in safety contexts.

According to another embodiment of the present invention, when the customer-provider relationship is broken down, the network slice brokering process acquires more knowledge about the real application needs thereby optimally instantiating/configuring/scaling network slicing resource requests. This case directly applies to an IoT environment where an ad-hoc 5G network slice is required to provide connectivity with specific target performance.

According to an embodiment, an interaction between the network slice management component and the IoT broker may include the negotiation of network resource requirements of the IoT broker. Likewise, according to an embodiment, an interaction between the network slice management component and the IoT broker may include negotiation of IoT data traffic configuration requests of the network slice management component, in particular requests for shaping/reshaping IoT data traffic (e.g. reduce or enlarge the granularity of gathered information) according to given criteria and based on messages exchanged within the framework of the interaction between the network slice management component and the IoT broker.

According to an embodiment, the network slice management component may be configured to provide updates to the IoT broker on the status of the one or more dedicated network slices. In particular, these updates may include information on the SLA status, resource utilization, capacity, and/or latency. The updates may be provided on a regular basis, or on demand.

According to an embodiment, the negotiation between the network slice management component and the IoT broker is triggered by changes to any of the network slices. In particular, these changes may be caused by IoT applications joining/leaving a dedicated network slice, by modifications of IoT applications, and/or by dedicated network slice SLA relaxation/strengthening based on dynamic network changes/congestions. It may be provided that negotiations are initiated in case a change in one of the relevant parameters exceeds a predefined configuration threshold. The negotiations may directly apply on the changes.

According to an embodiment, the network slice management component may be configured to indicate an underutilization of resources of any of the one or more dedicated network slices to the IoT broker. In such case, the IoT broker may react by advance scheduling of respective IoT traffic (including IoT reports and transmissions).

According to an embodiment, the IoT broker may be configured to adapt elastic IoT application requirements to respective SLA requirements of the one or more dedicated network slices. Specifically, the IoT broker may aggregate IoT applications requirements or may map IoT applications requirements onto an IoT network slice SLA requirements (as input of the 5G network slice manager).

According to an embodiment, the IoT broker may react to messages from the network slice management component by properly managing IoT traffic demands, in particular by taking into consideration the IoT traffic demands' heterogeneity and/or different granularity. In this context it is important to note that IoT traffic demands are highly heterogeneous (e.g., different magnitudes of response time requirements, different magnitude of bandwidth usage) and fine-grained (e.g., different aggregation levels of IoT data). Consequently, the IoT broker actually manages elastic SLAs, i.e. the IoT broker may react to messages from the network slice management component by adapting (e.g. aggregating/mapping/filtering) diverse IoT applications requirements onto multiple IoT network slice classes and SLA requirements.

According to an embodiment, the one or more dedicated network slices may be instantiated by the network slice management component by providing a set of network slice templates selectable by the IoT broker depending on the IoT traffic requirements. In other words, the network slice manager may provide a set of slice templates to be selected by the IoT broker for addressing the IoT traffic requirements.

According to an embodiment, the IoT broker may be configured to exposes a northbound interface for IoT data requests from IoT applications and to expose a southbound interface to IoT gateways or IoT devices through the respective dedicated network slice.

According to an embodiment, the IoT broker and the IoT applications communicate with each other via the IoT broker's northbound interface by using NGSI, Next Generation Safeguards Internship, query and subscription operations, in particular by using the NGSI context management interface (as described, e.g., in FI-WARE NGSI Open RESTful API Specification: https://forge.fiware.org/plugins/mediawiki/wiki/fiware/index.php/FI-WARE_NGSI Open_RESTful_API_Specification). However, as will be easily appreciated by those skilled in the art, other communication protocols with similar characteristics may be employed likewise.

Figure 2:
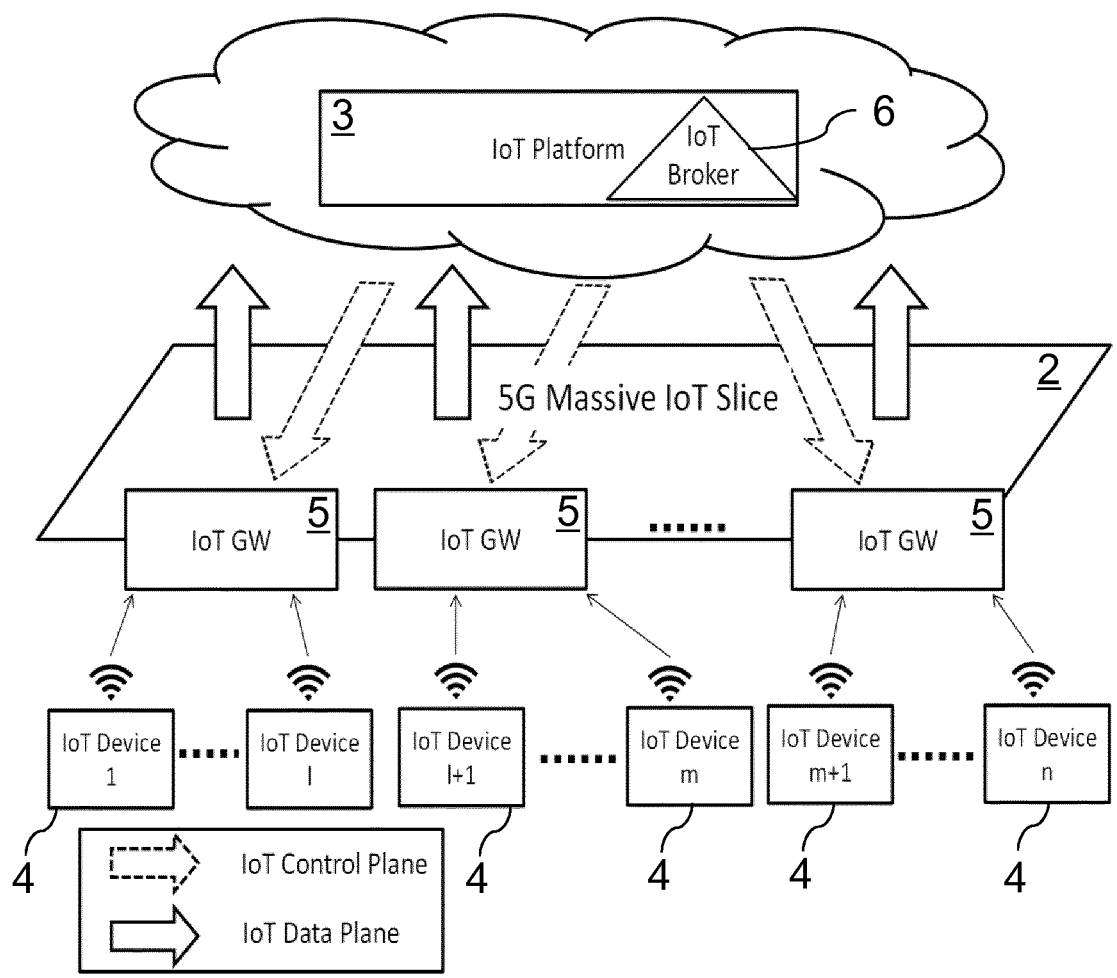
FIG. 2 is a schematic view illustrating an example of a typical Massive IoT deployment according to prior art.

FIG. 2 depicts a typical IoT deployment scenario where many IoT devices 4 communicate wirelessly (e.g., by using ZigBee, WiFi Direct or Bluetooth) with geographically distributed IoT Gateways (GW) 5 in charge of gathering IoT traffic data (e.g. by means of explicit requests, through subscription-notifications, etc.). Each IoT GW 5 is connected to the IoT Platform 3 where an IoT Broker 6 is responsible for dimensioning, delaying and/or scaling IoT data flows. This connection leverages on 5G facilities and it may benefit from a dedicated 5G network slice, namely 5G Massive IoT Slice 2.

Generally, a network slice, like e.g. the 5G Massive IoT Slice 2 as shown in FIG. 2, can be defined as follows (cf. NGMN Alliance: "NGMN 5G White Paper", Version 1.0, 17-February-2015):

"A network slice, namely "5G slice", supports the communication service of a particular connection type with a specific way of handling the C- and U-plane for this service. To this end, a 5G slice is composed of a collection of 5G network functions and specific RAT settings that are combined together for the specific use case or business model. Thus, a 5G slice can span all domains of the network: software modules running on cloud nodes, specific configurations of the transport network supporting flexible location of functions, a dedicated radio configuration or even a specific RAT, as well as configuration of the 5G device. Not all slices contain the same functions, and some functions that today seem essential for a mobile network might even be missing in some of the slices. The intention of a 5G slice is to provide only the traffic treatment that is necessary for the use case, and avoid all other unnecessary functionality. The flexibility behind the slice concept is a key enabler to both expand existing businesses and create new businesses. Third-party entities can be given permission to control certain aspects of slicing via a suitable API, in order to provide tailored services."

Figure 3:
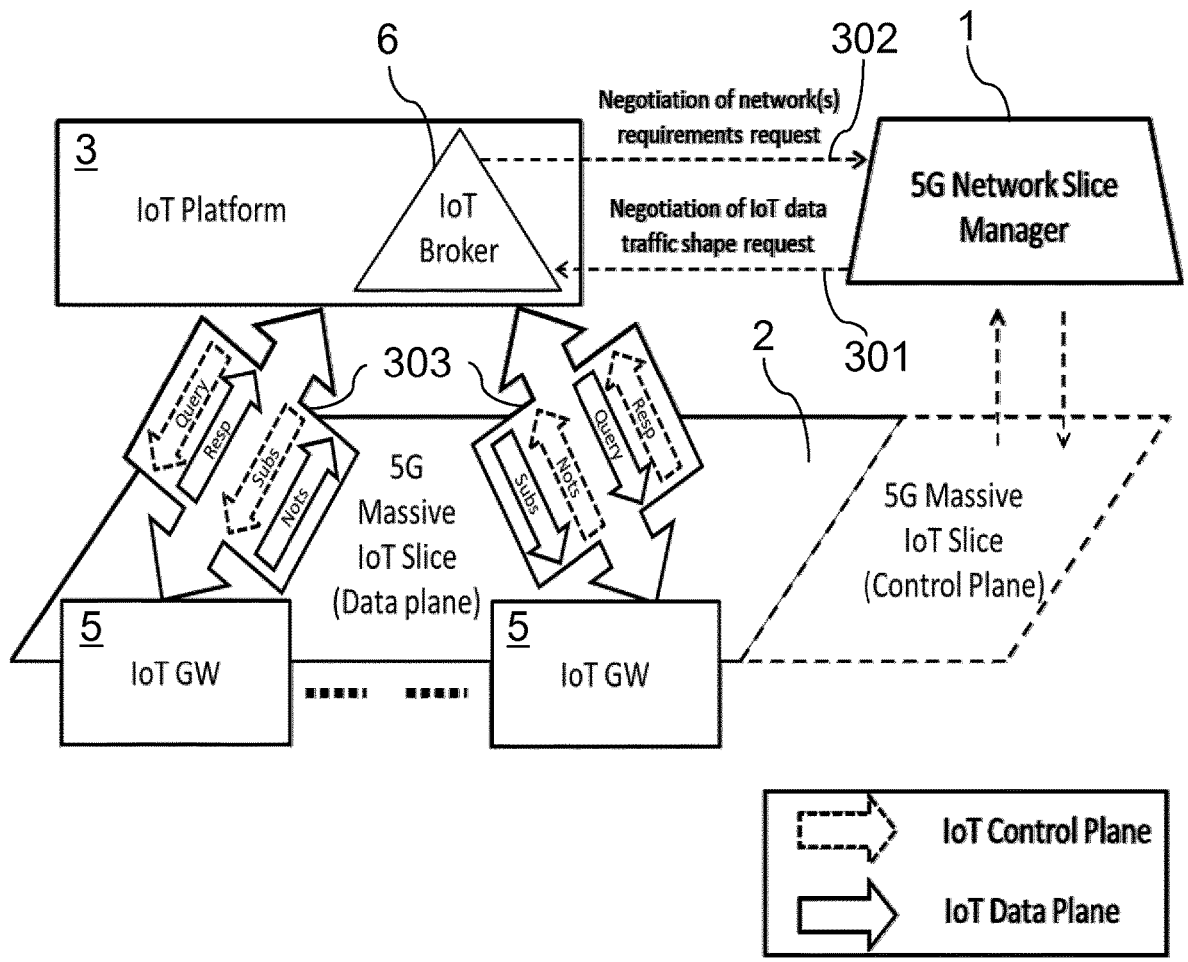
FIG. 3 is a schematic view illustrating the basic architecture of a system for IoT management in accordance with an embodiment of the present invention.

FIG. 3 is a schematic view illustrating the basic architecture of a system for IoT traffic management in accordance with an embodiment of the present invention. Specifically, according to this embodiment IoT communications are realized by means of 5G network premises. Within a network slicing context, the network operator instantiates an IoT-dedicated network slice 2, namely 5G Massive IoT Slice, which can be accessed by all IoT devices 4 based on prior agreements. Although not explicitly shown in FIG. 3, the dedicated network slice 2 consists of radio access network, fronthaul/backhaul transport nodes as well as core network facilities. Through such a dedicated network slice 2, IoT-related messages can reach the IoT platform 3 or the IoT Gateways (hereinafter briefly denoted IoT GWs) 5.

The 5G Massive IoT slice 2 accounts for both IoT control-plane (indicated by dashed lines in FIG. 3) and IoT data-plane (indicated by solid lines) messages. Control-plane messages are issued by the IoT Broker 6 to dynamically adjust the amount of data exchanged (via the data-plane) between the IoT platform 3 and the IoT GWs 5. 5G resources assigned to the 5G Massive IoT slice 2 are dynamically managed by a network slice management component 1, hereinafter sometimes the denoted 5G Network Slice Manager, through a dedicated control-plane channel. This communication might trigger resizing of slice resources to cope with unexpected and rapid network changes (such as network congestion, additional network slice instantiations, IoT SLAB renegotiation).

According to the illustrated embodiment, in order to support a joint and even more efficient control mechanism (i.e., for IoT control plane and 5G control plane), a direct interface is established between the % Network Slice Manager 1 and the IoT platform 3 (e.g., IoT broker 6) that leverages, e.g., novel resource negotiations and traffic reshaping operations. For instance, in case 5G network premises are under-utilized, the IoT platform 3 might decide (after receiving specific advertisements from the 5G network slice manager 1) to adopt a fine-grained data traffic, or, conversely, e.g. when network condition degradation or network resources preemption occur, the IoT platform 3 might ask to reduce data coming from the IoT GWs 5 (or to delay data after collecting a larger set of them).

Hereinafter, the functions and operations performed by each of the components of the system according to FIG. 3 will be described in more detail, starting with the 5G Network Slice Manager 1, which is configured to constantly monitor the traffic for each of the currently accommodated 5G slices 2. In particular, the 5G Network Slice Manager 1 checks whether the traffic does not exceed the respective network resource boundaries. In case an overflow is detected, the 5G Network Slice Manager 1 may request the IoT Broker 6 to re-shape the IoT Data traffic, as indicated at 301. On the other hand, in case of underutilization of the network resources, the 5G Network Slice Manager 1 may suggest to the IoT Broker 6 to increase the slice capabilities.

As generally indicated at 302, in case the 5G Network Slice Manager 1 receives a request from the IoT broker 6 to change the IoT network slice, the 5G Network Slice Manager 1 checks if it is possible to satisfy such a request without breaking requirements of other slice requests. If a solution is found, the 5G Network Slice Manager 1 may respond back to the IoT Broker 6 with an accepted request, otherwise with a reject response.

Communications 301 and 302 are exchanged via a bidirectional interface adapted to enable interaction between the 5G Network Slice Manager 1 and the IoT broker 6.

Figure 4:
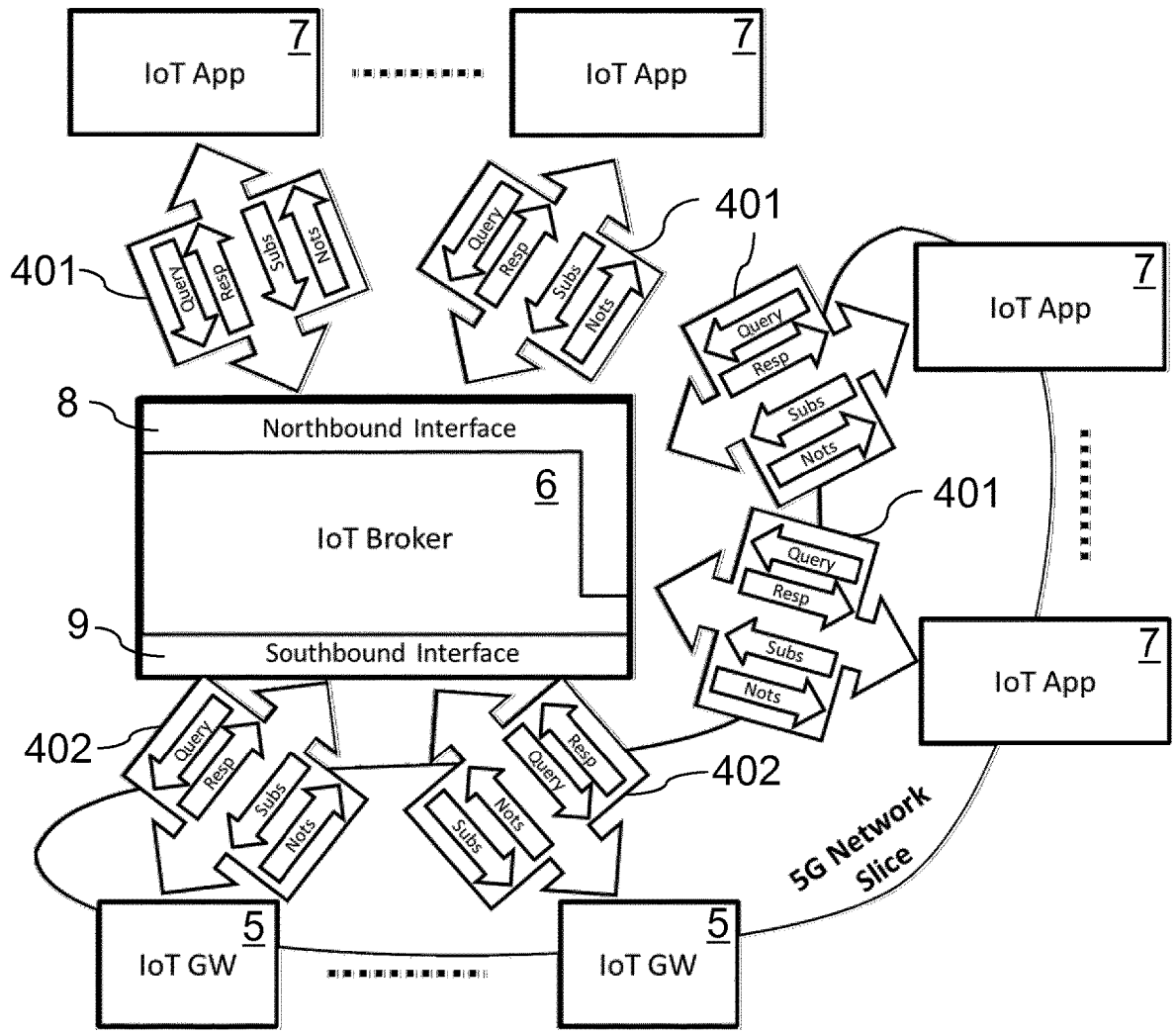
FIG. 4 is a schematic view illustrating IoT broker communication in a system for IoT management in accordance with an embodiment of the present invention.

Turning now to the IoT platform component 3, this component is configured to handle all the IoT communications. In relation to the IoT GWs 5, this IoT communication is indicated en bloc at 303 in FIG. 3. Furthermore, the IoT platform component 3 receives IoT requests from IoT applications 7, as shown in FIG. 4. More specifically, IoT requests coming from IoT applications 7 are received at an IoT broker 6 of the IoT platform 3 through a northbound interface 7, as shown in FIG. 4. Generally, the IoT broker 6 is configured to perform one or more of the following tasks: (i) mapping northbound requests into a set of southbound requests, (ii) sending IoT requests to IoT Components, e.g., IoT GWs 5, through the southbound interface, (iii) aggregating northbound requests QoS requirements into one or multiple QoS classes, (iv) measuring traffic generated for each of the IoT QoS classes, and/or (v) shaping the southbound IoT traffic by modifying the southbound requests parameters.

In particular, in case of necessity of larger sets of network slice resources, due to an increase of IoT data traffic (resulting from, e.g., an increase of IoT application requests, or from an increase of southbound IoT data) and inability to re-shape the actual traffic without infringing QoS requirements (e.g., mission critical data flows), the IoT broker 6 may request the 5G network slice manager 1 to scale-up the size of the network slice 2. On the other hand, in case of underutilization of the network slice 2 due to a reduction of IoT data traffic (resulting from, e.g., a reduction of IoT application requests, or from a reduction of southbound IoT data, etc.) or a reduction of aggregated QoS requirements, the IoT broker 6 may suggest the 5G network slice manager 1 to decrease the IoT slice 2.

In case the 5G network slice manager 1 requests the IoT broker 6 to re-shape the southbound IoT traffic in order to use less network resources (as indicated at 302 in FIG. 3), the IoT broker 6 tries to calculate a solution to change southbound request parameters subject to all the IoT QoS requirements. If such a solution is found, the IoT broker 6 responds back to the 5G network slice manager 1 with an accepted request, otherwise with a reject response.

FIG. 4 schematically shows an IoT broker 6 communication view in a system for IoT management in accordance with an embodiment of the present invention. Generally, in accordance with the specifications provided in IoT Broker GE Open Specs: 'https://forge.fiware.org/plugins/mediawiki/wiki/fiware/index.php/FIWARE. Open Specification.IoT.Backend.IoTBroker', the IoT broker component is foreseen to run on a machine in a data center, where it serves as a middleware that enables fast and easy access to Internet-of-Things data. The IoT broker 6 exposes a northbound interface 8 for IoT data requests, which can be conveyed either through a conventional network means, which does not present any resources limitations issue (e.g., fixed-line technology means), or through the IoT network slice 2, and exposes a southbound interface 9 through the IoT network slice 2.

Instead of having to deal directly with the technical details of existing deployments, application developers only need to set up their IoT application 7 to communicate with the IoT broker 6 in order to retrieve the data they need. The IoT broker 6 takes care of communication with different IoT Gateways 5 to retrieve all needed information on the behalf of any single application 7.

Applications 7 can access this information using the NGSI context management interface (as described, e.g., in FI-WARE NGSI Open RESTful API Specification: https://forge.fiware.org/plugins/mediawiki/wiki/fiware/index.php/FI-WARE_NGSI_Open_RESTful_API_Specification), which describes different types of operations for exchanging context information.

A first and most basic kind of operations is a simple query, as shown in communication blocks 401. When an application 7 invokes the query, it expects to receive IoT data as a single aggregated response (which is also indicated in communication blocks 401). Once received the query request, the IoT broker 6 maps the northbound request into a set of southbound query requests to IoT GWs 5, which will be asked for new data. These southbound query requests are indicated in communication blocks 402. How to choose IoT GWs 5 to be contacted relies on several aspects. As examples and not by way of limitations, the selection of IoT GWs 5 may be based on data queries parameters, since typically only a subset of IoT GWs 5 amongst the whole set of available IoT GWs 5 will contain the requested kind of data. Alternatively or additionally, the selection of IoT GWs 5 may be based on QoS requirements contained in the requests. In this context it is important to note, for example and not as way of limitation, that if a request is specifying to have a sparse density of observation per geographic region, chosen IoT GWs 5 are responsible for observations sensed far enough between each other. Still further, the selection of IoT GWs 5 may be based on load status of the IoT network slice 2: for example and not as way of limitation, there would be more IoT GWs 5 chosen in case of lightweight network load.

The NGSI query format is quite flexible and can carry information about Quality of Service requirements. As examples and not by way of limitations, the query can carry the following information:

```
NGSI Operation Scopes:
    It might contain granularity of the data.
        E.g.:
            <operationScope>
                <scopeType>GeographicAbstractionLevel</scopeType>
                <scopeValue>Sensor</scopeValue>
            </operationScope>
        E.g.:
            <operationScope>
                <scopeType>GeographicAbstractionLevel</scopeType>
                <scopeValue>Street</scopeValue>
            </operationScope>
        E.g.:
            <operationScope>
                <scopeType>GeographicDensity</scopeType>
                <scopeValue>0.1 observation/m²</scopeValue>
            </operationScope>
    It might contain latency requirements
        E.g.:
            <operationScope>
                <scopeType>MaxResponseTime</scopeType>
                <scopeValue>0.5s<scopeValue>
            </operationScope>
    It might declare a pre-defined QoS class (known by the IoT Broker)
        E.g.:
            <operationScope>
                <scopeType>QualityOfServiceClass</scopeType>
                <scopeValue>BestEffort<scopeValue>
            </operationScope>
```

A second kind of operations is a subscription. When an application 7 subscribes to certain IoT data, it receives a subscription ID as response. The IoT broker 6 maps the northbound request (of a communication block 401) into a set of southbound subscriptions (communication blocks 402) and sends them to IoT GWs 5, which will notify the IoT broker 6 about new IoT data. How to choose IoT GWs 5 to be contacted could be done similarly and with similar criteria as the query operation case (see above). IoT data is then aggregated and sent asynchronously to the respective application 7 in the form of notifications.

The NGSI subscription format is envisaged to contain specific fields for specifying QoS requirements but it is also extensible enough to express any other kind of QoS parameters. As examples and not by way of limitations, the subscription can carry the following kind of information:

```
                                    NGSI Subscription
Throttling: minimum interval between notifications.
        E.g.:
            <throttling>PT5m</throttling>
NGSI Operation Scopes besides the one specified before (see the query operation case
    above):
        It can contain max data traffic received per second:
            E.g.:
                <operationScope>
                    <scopeType>MaxBandwidth</scopeType>
                    <scopeValue>1 Kb/s<scopeValue>
                </operationScope>
Notify Conditions
        ONTIMEINTERVAL, it might specify the expected sampling time:
            E.g.
                <notifyCondition>
                    <type>ONTIMEINTERVAL</type>
                    <condValueList>
                        <condValue>PT3s</condValue>
                    </condValueList>
                </notifyCondition>
        ONVALUE, it might specify the condition under which the notification should
            be sent to the application
            E.g. specific condition on the values:
                <notifyCondition>
                    <type>ONVALUE</type>
                    <restriction>
                    <attributeExpression>//contextAttribute[name='temperature'][value>3
                    5 or value<0]</attributeExpression>
                    </restriction>
                </notifyCondition>
            E.g. specific condition on metadata of the values (only aggregated
                value):
                <notifyCondition>
                    <type>ONVALUE</type>
                    <restriction>
```

| NGSI Subscription |
|---|
| ```
            <attributeExpression>//contextAttribute/metadata/contextMetadata[na
        me='aggregation'][value='mean']</attributeExpression>
            </restriction>
        </notifyCondition>
ONCHANGE
    E.g. only if the specified attribute changes
        <notifyCondition>
            <type>ONCHANGE</type>
            <condValueList>
                <condValue>temperature</condValue>
                <condValue>co2</condValue>
            </condValueList>
        </notifyCondition>
    E.g. only if the specified attribute changes of the given percentage
        <notifyCondition>
            <type>ONCHANGE</type>
            <condValueList>
                <condValue>temperature</condValue>
            </condValueList>
            <restriction>
                <operationScope>
                    <scopeType>tolerance</scopeType>
                    <scopeValue>10%<scopeValue>
                </operationScope>
            </restriction>
        </notifyCondition>
    E.g. only if the specified attribute changes of the given absolute value
        <notifyCondition>
            <type>ONCHANGE</type>
            <condValueList>
                <condValue>temperature</condValue>
            </condValueList>
            <restriction>
                <operationScope>
                    <scopeType>tolerance</scopeType>
                    <scopeValue>1<scopeV alue>
                </operationScope>
            </restriction>
        </notifyCondition>
``` |

In addition, the Quality of Service parameters might be implicitly understood by the IoT broker 6 based on, as examples and not by way of limitations:

```
Specific entity identifiers:
    E.g.
        <entityIdList>
            <entityId>
                <id> EmergencyExit-1</id>
            </entityId>
        </entityIdList>
Pattern of entity identifiers:
    E.g.
        <entityIdList>
            <entityId isPattern="true">
                <id>EmergencyExit-.*</id>
            </entityId>
        </entityIdList>
Type of entities:
    E.g.
        <entityIdList>
            <entityId isPattern="true" type="emergencyexit">
                <id>.*</id>
            </entityId>
        </entityIdList>
Specific Attribute:
    E.g.
        <entityIdList>
            <entityId isPattern="true">
                <id>.*</id>
            </entityId>
        </entityIdList>
        <attributeList>
```

-continued

```
            <attribute>firedetected</attribute>
        </ attributeList >
A combination of the above
```

This approach might be applied to both Subscription and Query. The association of an entity identifier, entity type and/or attribute type to a QoS can be kept, as examples and not by way of limitations, in a knowledge base server or a look-up table.

Figure 5:
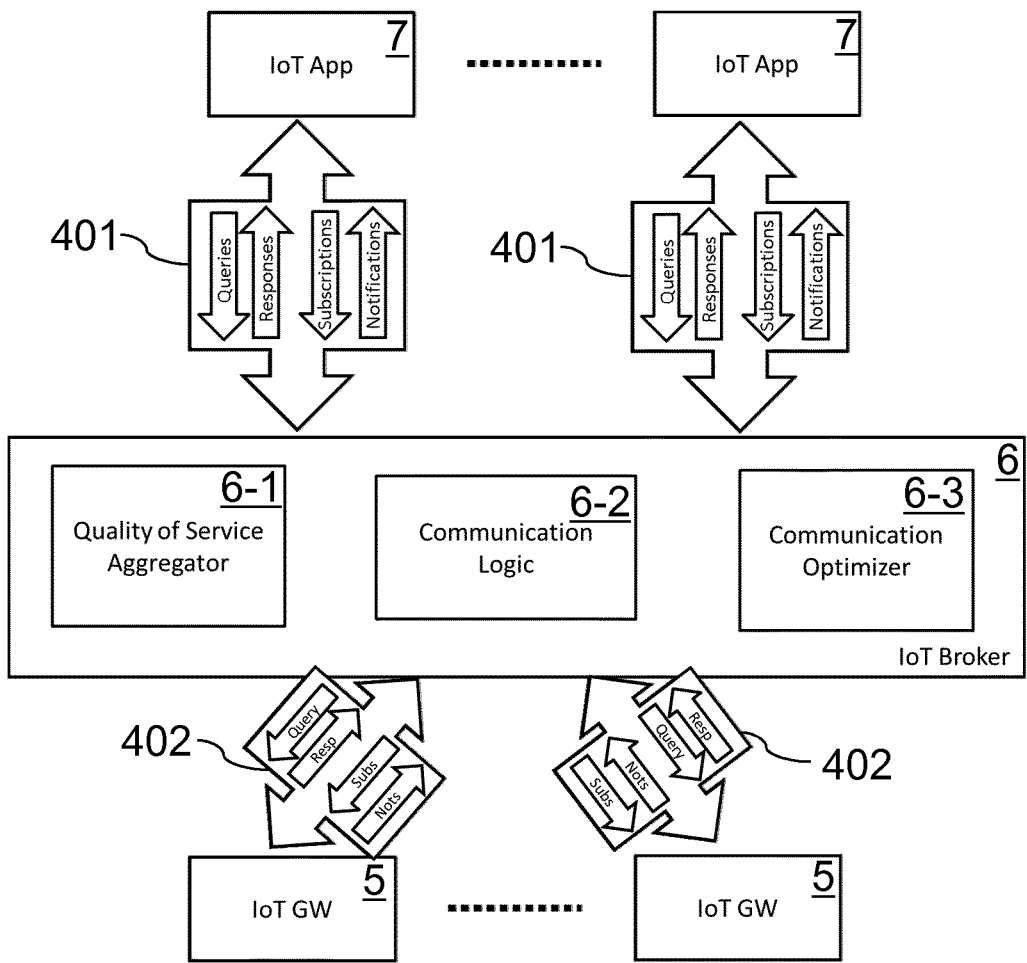
FIG. 5 is a schematic view illustrating IoT broker functionality in a system for IoT management in accordance with an embodiment of the present invention.

FIG. 5 schematically shows an IoT broker 6 functional view in a system for IoT management in accordance with an embodiment of the present invention. Due to its centrality for IoT data dispatcher, the IoT broker 6 is suited for various functionalities including, but not limited to, one or more of the following, or combinations thereof:

1) The IoT broker 6 may comprise a Quality of Service Aggregator component 6-1 for aggregating all data requirements from the applications 7. Specifically, this component 6-1 of the IoT broker 6 might map all the requirements into a single or multiple classes of Quality of Service, which would differ in terms of bandwidth consumptions, real-timeness, etc.
2) The IoT broker 6 may also comprise a communication logic component 6-2, in particular for monitoring the data traffic: The component 6-2 continuously measures the data traffic passing through the IoT broker 6 for each of the different QoS classes (if more than one).

The traffic size might fluctuate, for instance, due to changes of amount of applications 7 requesting data via query, changes of frequency of notifications coming from the IoT GWs 5, changes of data parameters into query/subscriptions, or changes of QoS parameters into query/subscriptions.

3) Still further, the IoT broker 6 may comprise a communication optimizer component 6-3 for optimizing the traffic for a better usage of the resources: This component 6-3 of the IoT broker 6 might implement optimization algorithms for maximizing the usage of the 5G network slice 2 resources and, at the same time, satisfying all the QoS requirements. The component 6-3 might shape the southbound traffic, for examples and not by way of limitations, by changing the set of IoT GWs 5 chosen for satisfying data queries and/or subscription requests, by changing data and/or QoS (e.g., data granularity, data frequency) parameters of the active and/or future southbound subscriptions to IoT GWs 5, thus acting on the mapping between northbound and southbound subscriptions, by changing data and/or QoS parameters to the queries sent through the southbound interface, thus acting on the mapping between northbound and southbound queries.

Furthermore the IoT broker 6 might shape also the northbound traffic going through the IoT slice 2 by implementing a queue system for query response and/or notifications for each class of QoS and therefore changing the queue parameters in order to privilege higher QoS classes. For example and not by way of limitations, in case of two classes of QoS like "best effort" and "mission critical", messages of the first class will be sent only in case no "mission critical" messages are queued or when a maximum time period is reached. In case of high load of "mission critical" data, the maximum time period for "best effort" messages will be increased such that messages will be sent in bunch, but less frequently.

In addition, the IoT broker 6 might use the same southbound subscription for more than one northbound subscription. A different approach can be applied to certain QoS classes (most likely low priority) northbound queries which can be collected for a certain period, aggregated, and then mapped to southbound requests: this approach could lead to a number of southbound queries (and therefore resulting data traffic) never greater than the ones which would be generated if each request would be satisfied independently.

The IoT broker 6 could even adopt some cache system in order to re-use results from other queries if the QoS class of the request would accept a certain degree of data staleness.

Some functionality exposed might be implemented also in the IoT GWs 5 in order to bring some QoS optimization also at GWs level.

Finally, it is noted that in the described embodiment the IoT broker 6 is meant here to be a single logical component which can be indefinitely scalable.

Figure 6:
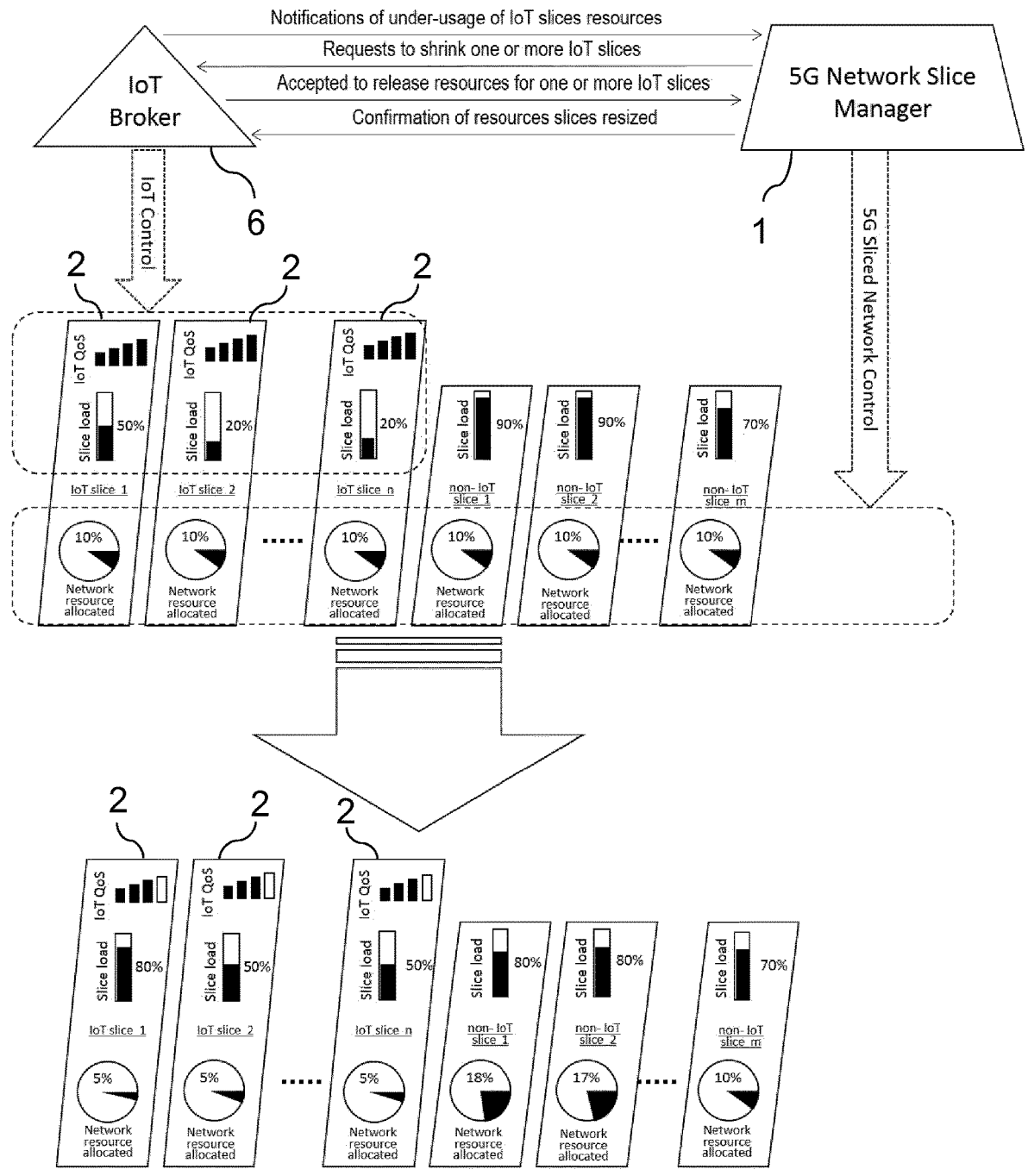
FIG. 6 is a schematic view illustrating the interaction between the IoT broker and the 5G Network Slice Manager in accordance with an embodiment of the present invention

FIG. 6 is a schematic view illustrating the interaction between the IoT broker 6 and the 5G Network Slice Manager 1 in accordance with an embodiment of the present invention. In the illustrated embodiment it is assumed that a number of n (i.e. 1, . . . , n) dedicated IoT network slices 2 and a number of m (i.e. 1, . . . , m) non-IoT network slices are configured. For each network slice, FIG. 6 shows two diagrams that indicate the network resource allocated to the respective slice (in percent of the overall available network resources) and the current slice load (in percent of the overall available load for the respective slice). While the IoT broker 6 controls the dedicated IoT network slices 2 only, the 5G Network Slice Manager 1 has control over both the dedicated IoT network slices 2 and the non-IoT network slices (as indicated by the dashed line frames).

In the illustrated embodiment, the IoT Broker 6 notifies the 5G Network Slice Manager 1 about resource under-usages of one or more of the IoT slices 2 (in particular, IoT slices #2 and # n have a current slice load of 20% only). Upon receiving this notification, the 5G Network Slice Manager 1 checks the non-IoT slices' status. Doing so, the 5G Network Slice Manager 1 realizes that, in the illustrated case, the load of some of the non-IoT slices is rather high (in particular, non-IoT slices #1 and #2 are loaded with 90%). Consequently, the 5G Network Slice Manager 1 requests the IoT Broker 6 to reduce the size of one or more of the dedicated IoT slices 2. In reaction to this request, the IoT Broker 6 reduces the size of one or more IoT slices 2 and informs the 5G Network Slice Manager 1 on the set of IoT slices 2 to shrink down. The 5G Network Slice Manager 1 confirms that one or more IoT slices 2 have been resized. Specifically, in the illustrated embodiment the allocated network resources of IoT slices #1, #2 and # n have been reduced in each case from 10% to 5% (as shown in the lower part of FIG. 6). As a result, the slice load is increased (e.g. for IoT slices #1 from 50% to 80%). In accordance with the embodiment of the present invention, in order to take account of the fact of the increased load, the IoT Broker 6 acts on the IoT traffic of the respective IoT slices 2, thereby reducing the IoT Quality of Service (QoS) of those slices (as indicated by the bar charts in FIG. 6).

Figure 7:
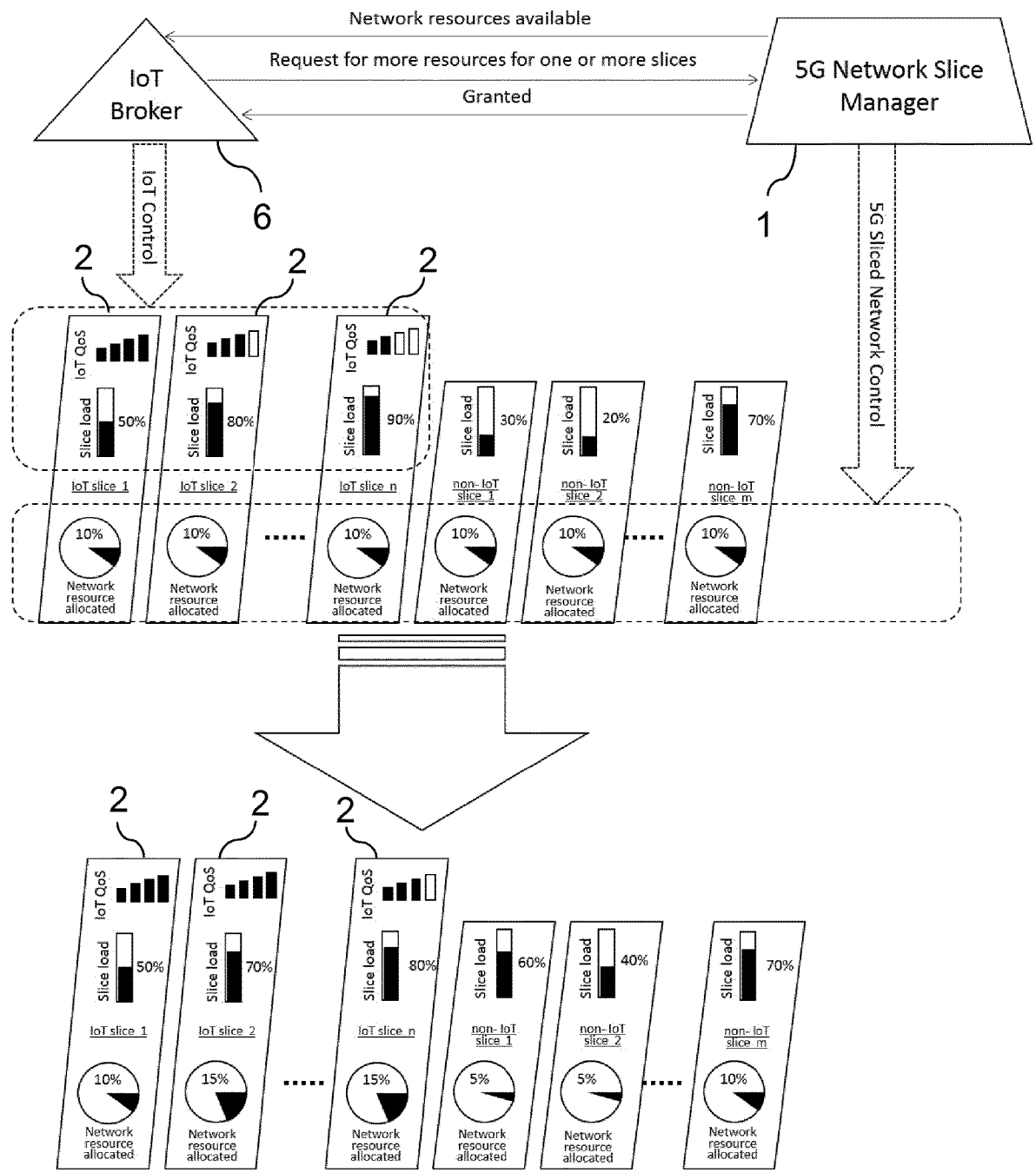
FIG. 7 is a schematic view illustrating the interaction between the 5G Network Slice Manager and the IoT broker in accordance with an embodiment of the present invention.

FIG. 7 is a schematic view illustrating the interaction between the 5G Network Slice Manager 1 and the IoT broker 6 in accordance with an embodiment of the present invention. The configured network slices are the same as in FIG. 6.

In the scenario illustrated in FIG. 7, the network is lightly loaded and the 5G Network Slice Manager 1 is aware that some of the non-IoT slices 2 are using few network resources (non-IoT slices #1 and #2 with a slice load of 30% and 20%, respectively). Consequently, the 5G Network Slice Manager 1 announces to the IoT Broker 6 about the available resources. Upon receiving this announcement, the IoT Broker 6 checks the IoT traffic conditions and finds that for some of the dedicated IoT slices 2 the slice load is pretty high (i.e. 80% for slice #2 and 90% for slice # n) and that also the IoT Quality of Service (QoS) for these slices is suboptimal. Therefore, the IoT Broker 6 decides to request more resources for the IoT slice #2 and IoT slice # n.

Upon receiving this request from the IoT Broker 6, the 5G Network Slice Manager 1 grants requested resources to the IoT Broker 6 by enlarging the sizes of the respective IoT slices 2 (i.e. from 10% to 15%, as shown in the lower part of FIG. 7), which results in a decrease of the slice load from 80% to 70% in case of slice #2 and from 90% to 80% in case of slice # n. Due to these decreased slice loads, the IoT Broker 6 may decide to improve the IoT QoS of IoT slice #2 and IoT slice # n by leveraging on the new allocated network resources (i.e. the IoT QoS increases from 3 bars to 4 bars in case of slice #2, and from 2 bars to 3 bars in case of slice # n, as indicated in the respective IoT QoS bar charts of FIG. 7).

Figure 8:
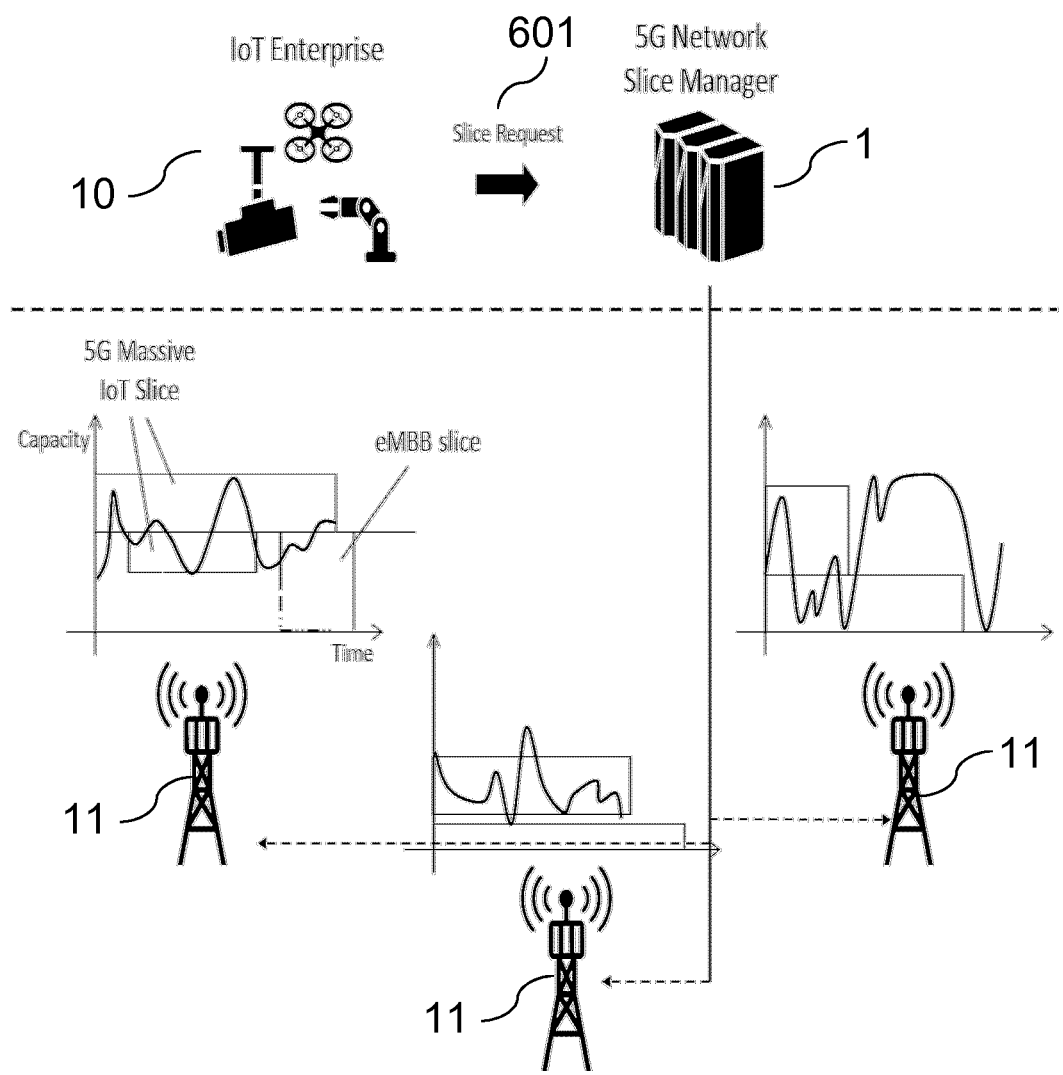
FIG. 8 is a schematic view illustrating 5G RAN slicing operational procedures in accordance with embodiments of the present invention.

As already mentioned above, the 5G Network Slice Manager 1 is the network component in charge of (i) interfacing with external network tenants in order to accept/reject requests for new slices 2, (ii) managing the instantiation/resize/maintenance/deletion of slices 2, and (iii) monitoring slice 2 traffic. FIG. 8 shows an example, where the 5G Network Slice Manager 1 receives a new slice request 601 from an IoT Enterprise 10 asking for a certain amount of capacity to be used by IoT devices. According to embodiments the slice request 601 may comprise a given number of Physical Resource Blocks (RBs), a given Network Capacity [expressed in Mb/s], a maximum latency allowed, high reliability, or even a combination of them. If there are sufficient network capabilities available to accommodate the new slice request 601, the 5G Network Slice Manager 1 instantiates a new slice 2 by instructing eNBs 11 to dedicate a given portion of resources. While this example mostly focuses on network slicing management on the Radio Access Network (RAN), it will be easily appreciated by those skilled in the art that it can be readily extended to the transport and core network elements.

For instance, an application scenario of the embodiment of FIG. 6 could be a city council that owns a virtualized infrastructure (or network slice priority granted) and leases it (either completely or parts thereof) to different municipal domains, e.g., police, homeland security, public transportation companies, domestic energy providers, and markets association (shops/shopping mall). In such scenario the IoT Broker 6 and the Network Slice Manager 1 could reside within the same administrative premises pursuing the same objective: maximization of network utilization. In this case, the IoT Broker 6 plays a role of a single infrastructure tenant and manages the dedicated IoT network slice 2. Other tenants can be envisaged as the other municipal domains.

In some embodiments, it is possible to have more than one IoT slice 2, each handled by one IoT Broker 6. The 5G Network Slice Manager 1 is in charge to handle all tenants' requests.

According to another application scenario of the embodiment of FIG. 8, the network operator owns the network slice manager 1, whereas a massive IoT Slice 2 is already instantiated (with an IoT broker 6 successfully installed). An interaction may be established between the network slice manager 1 and the IoT broker 6 aiming at improving the resource utilization efficiency (from the operator's perspective), and/or aiming at reducing network slice cost (from the IoT tenant's perspective) by offering a better utilization fee for a flexible and dynamically adaptable slice.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for Internet of Things (IoT) traffic management in a communication network supporting a plurality of network slices, in particular a 5th generation wireless communication network, the method comprising:

by a network slice management component, dynamically assigning network resources to a number of network slices, wherein one or more of the network slices are dedicated IoT network slices being adapted to enable IoT-related communications between an IoT platform and IoT devices or IoT gateways, and by the network slice management component, interacting with an IoT broker associated with the IoT platform and, based on the interaction, performing actions with respect to an allocation of network resources to the number of network slices and/or triggering actions on the IoT broker with respect to a configuration of IoT data traffic;

wherein the interaction between the network slice management component and the IoT broker includes negotiation of IoT data traffic configuration requests of the network slice management component.

2. The method according to claim 1, wherein the interaction between the network slice management component and the IoT broker includes negotiation of network resource requirements of the IoT broker.

3. The method according to claim 2, wherein the negotiation between the network slice management component and the IoT broker is triggered by changes to the one or more dedicated IoT network slices caused by joining/leaving IoT applications, by modifications of IoT applications, and/or by dedicated network slice SLA relaxation/strengthening based on dynamic network changes/congestions.

4. The method according to claim 1, wherein the network slice management component indicates an underutilization of resources of any of the one or more dedicated IoT network slices to the IoT broker, and wherein the IoT broker reacts by advance scheduling of respective IoT traffic.

5. The method according to claim 1, wherein the IoT broker reacts to messages from the network slice management component by properly managing IoT traffic demands.

6. The method according to claim 1, wherein the one or more dedicated IoT network slices are instantiated by the network slice management component by providing a set of network slice templates selectable by the IoT broker depending on IoT traffic requirements.

7. A method for Internet of Things (IoT) traffic management in a communication network supporting a plurality of network slices, in particular a 5th generation wireless communication network, the method comprising:

by a network slice management component, dynamically assigning network resources to a number of network slices, wherein one or more of the network slices are dedicated IoT network slices being adapted to enable IoT-related communications between an IoT platform and IoT devices or IoT gateways, and by the network slice management component, interacting with an IoT broker associated with the IoT platform and, based on the interaction, performing actions with respect to an allocation of network resources to the number of network slices and/or triggering actions on the IoT broker with respect to a configuration of IoT data traffic;

wherein the network slice management component provides updates to the IoT broker on the status of the one or more dedicated IoT network slices, including information on the SLA status, resource utilization, capacity, and/or latency.

8. A method for Internet of Things (IoT) traffic management in a communication network supporting a plurality of network slices, in particular a 5th generation wireless communication network, the method comprising:

by a network slice management component, dynamically assigning network resources to a number of network slices, wherein one or more of the network slices are dedicated IoT network slices being adapted to enable IoT-related communications between an IoT platform and IoT devices or IoT gateways, and by the network slice management component, interacting with an IoT broker associated with the IoT platform and, based on the interaction, performing actions with respect to an allocation of network resources to the number of network slices and/or triggering actions on the IoT broker with respect to a configuration of IoT data traffic;

wherein the IoT broker adapts elastic IoT application requirements to respective SLA requirements of the one or more dedicated IoT network slices.

9. A method for Internet of Things (IoT) traffic management in a communication network supporting a plurality of network slices, in particular a 5th generation wireless communication network, the method comprising:

by a network slice management component, dynamically assigning network resources to a number of network slices, wherein one or more of the network slices are dedicated IoT network slices being adapted to enable IoT-related communications between an IoT platform and IoT devices or IoT gateways, and by the network slice management component, interacting with an IoT broker associated with the IoT platform and, based on the interaction, performing actions with respect to an allocation of network resources to the number of network slices and/or triggering actions on the IoT broker with respect to a configuration of IoT data traffic;

wherein the IoT broker manages IoT traffic demands by taking into consideration the IoT traffic demands' heterogeneity and/or different granularity of IoT traffic demands.

10. A method for Internet of Things (IoT) traffic management in a communication network supporting a plurality of network slices, in particular a 5th generation wireless communication network, the method comprising:

by a network slice management component, dynamically assigning network resources to a number of network slices, wherein one or more of the network slices are dedicated IoT network slices being adapted to enable IoT-related communications between an IoT platform and IoT devices or IoT gateways, and by the network slice management component, interacting with an IoT broker associated with the IoT platform and, based on the interaction, performing actions with respect to an allocation of network resources to the number of network slices and/or triggering actions on the IoT broker with respect to a configuration of IoT data traffic;

wherein the IoT broker exposes a northbound interface for IoT data requests from IoT applications and a southbound interface through the respective dedicated IoT network slice.

11. The method according to claim 10, wherein the IoT broker and the IoT applications communicate with each other via the northbound interface of the IOT broker by using Next Generation Safeguards Internship (NGSI), query and subscription operations.

12. A system for IoT traffic management in a communication network supporting a plurality of network slices, in particular a 5th generation wireless communication network, the system being configured to perform the method of claim 1, the system comprising:

a network slice management component configured to dynamically assign network resources to a number of network slices, wherein one or more of the network slices are dedicated IoT network slices that are adapted to enable IoT-related communications between an IoT platform and IoT devices or IoT gateways, an IoT broker configured to gather IoT data from IoT devices or IoT gateways based on IoT requests from IoT applications, and a bidirectional interface adapted to enable interaction between the network slice management component and the IoT broker, wherein the network slice management component is adapted, based on the interaction, to allocate network resources to the number of network slices and/or to trigger actions on the IoT broker with respect to a configuration of IoT data traffic.

13. A network slice management component configured to dynamically assign network resources to a number of network slices, wherein one or more of the network slices are dedicated IoT network slices being adapted to enable IoT-related communications between an IoT platform and IoT devices or IoT gateways, wherein the network slice management component is configured to perform the method of claim 1.

* * * * *